(12) United States Patent
Toyama et al.

(10) Patent No.: US 8,980,436 B2
(45) Date of Patent: Mar. 17, 2015

(54) PRESSURE-SENSITIVE ADHESIVE OPTICAL FILM, PRODUCTION METHOD THEREOF, AND IMAGE DISPLAY

(75) Inventors: Yuusuke Toyama, Ibaraki (JP); Shinichi Inoue, Ibaraki (JP); Mizue Nagata, Ibaraki (JP); Toshitsugu Hosokawa, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 1514 days.

(21) Appl. No.: 12/262,771

(22) Filed: Oct. 31, 2008

(65) Prior Publication Data

US 2009/0116111 A1    May 7, 2009

(30) Foreign Application Priority Data

Nov. 2, 2007   (JP) ................. 2007-286245

(51) Int. Cl.
   B32B 27/30    (2006.01)
   B32B 33/00    (2006.01)
   C08F 2/48     (2006.01)
   G02B 1/10     (2006.01)
   C09J 7/02     (2006.01)
   C09J 133/06   (2006.01)

(52) U.S. Cl.
   CPC ............ C09J 7/0246 (2013.01); C09J 133/066 (2013.01); *C09J 2433/00* (2013.01)
   USPC .......... 428/520; 428/40.1; 428/345; 428/580; 526/319; 526/320; 427/508; 156/275.5

(58) Field of Classification Search
   CPC .. C09J 7/0246; C09J 133/066; C09J 2433/00; B32B 27/30; B32B 33/00; C08F 2/48
   USPC ................. 526/319, 320; 428/40.1, 345, 580; 427/508; 359/580; 156/275.5
   See application file for complete search history.

(56) References Cited

U.S. PATENT DOCUMENTS

| 6,485,826 | B1 | 11/2002 | Watanabe et al. |
| 2004/0234771 | A1 | 11/2004 | Meyer et al. |
| 2006/0121273 | A1 | 6/2006 | Toyama et al. |
| 2007/0148485 | A1* | 6/2007 | Kusama et al. ............ 428/520 |

FOREIGN PATENT DOCUMENTS

| JP | 8-218048 | A | 8/1996 |
| JP | 9-176603 | A | 7/1997 |
| JP | 09-230138 | A | 9/1997 |
| JP | 10-279900 | A | 10/1998 |
| JP | 2006-183022 | A | 7/2006 |
| JP | 2007-191671 | A | 8/2007 |
| WO | 2006-088099 | A1 | 8/2006 |

OTHER PUBLICATIONS

European Search Report dated Jan. 23, 2009, issued in corresponding European Patent Application No. 08019182.8.
Taiwanese Office Action dated May 2, 2012, issued in corresponding Taiwanese Patent Application No. 097141071, with English translation (9 pages).
Korean Office Action dated Apr. 12, 2012, issued in corresponding Korean Patent Application No. 2011-0141652, with English translation (8 pages).
Japanese Office Action dated Aug. 30, 2013 in corresponding Japanese Application No. 2008-265475, w/English Translation. (6 pages).
Japanese Office Action dated Apr. 9, 2014, issued in corresponding Japanese Patent Application No. 2008-265475, w/English translation (7 pages).
Japanese Office Action dated Nov. 9, 2012, issued in corresponding Japanese Patent Application No. 2008-265475, with English translation (5 pages).
Decision of the Intellectual Property Office dated Dec. 10, 2012, issued in corresponding Taiwanese Patent Application No. 097141071, w/ English translation.

* cited by examiner

*Primary Examiner* — Michael M Bernshteyn
(74) *Attorney, Agent, or Firm* — Westerman, Hattori, Daniels & Adrian, LLP

(57) ABSTRACT

A pressure-sensitive adhesive optical film of the present invention comprises an optical film; and a pressure-sensitive adhesive layer laminated on at least one side of the optical film, wherein the pressure-sensitive adhesive layer is formed from an acrylic pressure-sensitive adhesive comprising a (meth)acrylic polymer comprising 30 to 99.99% by weight of an alkyl(meth)acrylate monomer unit and 0.01 to 15% by weight of a functional group-containing monomer unit, and the (meth)acrylic polymer in the acrylic pressure-sensitive adhesive is crosslinked by electron beam irradiation. The pressure-sensitive adhesive optical film has a high level of reworkability, durability and workability.

9 Claims, No Drawings

PRESSURE-SENSITIVE ADHESIVE OPTICAL FILM, PRODUCTION METHOD THEREOF, AND IMAGE DISPLAY

BACKGROUND OF THE INVENTION

1. Field of the Invention

The present invention relates to a pressure-sensitive adhesive optical film and a production method thereof. The present invention further relates to an image display such as a liquid crystal display and an organic electroluminescence (EL) display, including the pressure-sensitive adhesive optical film. The optical film may be a polarizing plate, a retardation plate, an optical compensation film, a brightness enhancement film, a laminate thereof, or the like.

2. Description of the Related Art

The image-forming system of liquid crystal displays or the like requires polarizing elements to be placed on both sides of a liquid crystal cell, and generally polarizing plates are attached thereto. Besides polarizing plates, a variety of optical elements have been used for liquid crystal panels to improve display quality. For example, there are used retardation plates for prevention of discoloration, viewing angle expansion films for improvement of the viewing angle of liquid crystal displays, and brightness enhancement films for enhancement of the contrast of displays. These films are generically called optical films.

When the optical films are attached to a liquid crystal cell, pressure-sensitive adhesives are generally used. Bonding between an optical film and a liquid crystal cell or between optical films is generally performed with a pressure-sensitive adhesive in order to reduce optical loss. In such a case, a pressure-sensitive adhesive optical film including an optical film and a pressure-sensitive adhesive layer previously formed on one side of the optical film is generally used, because it has some advantages such as no need for a drying process to fix the optical film.

Since the optical film used in the pressure-sensitive adhesive optical film can easily shrink or expand under heating or humidifying conditions, the pressure-sensitive adhesive optical film can easily separate or peel after it is attached to a liquid crystal cell. Therefore, the pressure-sensitive adhesive layer is required to have durability against heating, humidifying and so on. The pressure-sensitive adhesive layer is also required to have workability such that it can be worked without pressure-sensitive adhesive fouling or dropout after it is formed on an optical film.

For the durability, a crosslinking agent is added to the pressure-sensitive adhesive so that a crosslinked pressure-sensitive adhesive layer can be formed. The crosslinking agent used is typically an isocyanate crosslinking agent or an epoxy crosslinking agent. When these crosslinking agents are used, however, crosslinking is still incomplete after coating and drying, and, therefore, an aging time is necessary after the coating and drying. The necessary aging time is generally from about one day to about one week. On the other hand, if a cutting process is performed without the aging, the pressure-sensitive adhesive can adhere to a cutting blade, or troubles such as adhesion between laminated upper and lower cut pieces can occur, so that the yield of the manufacturing process can be reduced. In addition, distribution of products is stopped during the aging, which is unfavorable in terms of delivery. If heat treatment is performed to accelerate the aging, the optical film can undesirably undergo changes in size or degradation in optical properties.

In addition, the pressure-sensitive adhesive layer is required to have requisite characteristics. In some cases, for example, if in the process of adhering an optical film to a liquid crystal cell, they are misaligned or foreign matter is caught on the adhering surface, the optical film should be peeled off from a liquid crystal panel so that the liquid crystal cell can be recycled, and the pressure-sensitive adhesive should have re-peelability (reworkability) such that the optical film can be easily peeled off from the liquid crystal panel with no adhesive residue in a peeling process. Particularly in recent years, thin liquid crystal panels having chemically-etched glass plates are frequently used together with conventional panel manufacturing processes, and it has become difficult to realize reworkability or workability of optical films from the thin liquid crystal panels. Further, in some cases, a pressure-sensitive adhesive optical film is adhered to a liquid crystal cell, and then the pressure-sensitive adhesive layer is subjected to a heating and pressure-bonding treatment (such as autoclaving) or a heating and drying treatment for several hours to several tens of hours. In such cases, peeling strength can be very high in the process of peeling off the optical film from the liquid crystal panel so that the gap in the liquid crystal cell can be changed, a part of the optical film can be broken and left on the liquid crystal panel, or the like can occur, and, therefore, the re-peelability (reworkability) is not sufficiently achieved.

In conventional techniques, acrylic pressure-sensitive adhesives are typically used to form pressure-sensitive adhesive layers for pressure-sensitive adhesive optical films. Pressure-sensitive adhesives layers produced from such acrylic pressure-sensitive adhesives generally have a crosslinked structure in which a (meth)acrylic polymer used as a base polymer is crosslinked by a crosslinking agent. For example, it is proposed that the acrylic pressure-sensitive adhesive should include a curing agent and a (meth)acrylic copolymer of divinylbenzene and an acrylic monomer (See JP-A No. 08-218048). It is disclosed that such an acrylic pressure-sensitive adhesive can reduce changes in cohesion and adhesion under high-temperature and high-humidity conditions over time, provide good adhesion particularly between an optical film and a glass substrate, and have high durability such that the acrylic pressure-sensitive adhesive does not cause defects such as peeling off and foaming of the adhesive. It is also disclosed that the acrylic pressure-sensitive adhesive particularly shows an excellent effect, after it is applied to a base material and then irradiated with an electron beam. However, it cannot be said that the conventional pressure-sensitive adhesive optical film can satisfy reworkability, although it can satisfy durability.

Besides the above, it is also proposed that an acrylic pressure-sensitive adhesive for use in bonding optical films to glass materials should include a mixture in which a peroxide is added to a (meth)acrylic polymer (See JP-A No. 2006-183022). It is disclosed that this acrylic pressure-sensitive adhesive can have high durability and good workability (handleability) in terms of manufacturing process based on a thermal decomposition reaction of the peroxide. However, the acrylic pressure-sensitive adhesive described in JP-A No. 2006-183022 cannot achieve satisfactory reworkability.

SUMMARY OF THE INVENTION

An object of the present invention is to provide a pressure-sensitive adhesive optical film having a high level of reworkability, durability and workability and a method for producing thereof.

A further object of the present invention is to provide an image display using the pressure-sensitive adhesive optical film.

As a result of investigations for solving the problems, the inventors have found the pressure-sensitive adhesive optical film described below and have completed the present invention.

The present invention relates to a pressure-sensitive adhesive optical film, comprising:

an optical film; and a pressure-sensitive adhesive layer laminated on at least one side of the optical film, wherein the pressure-sensitive adhesive layer is formed from an acrylic pressure-sensitive adhesive comprising a (meth)acrylic polymer comprising 30 to 99.99% by weight of an alkyl(meth)acrylate monomer unit and 0.01 to 15% by weight of a functional group-containing monomer unit, and the (meth)acrylic polymer in the acrylic pressure-sensitive adhesive is crosslinked by electron beam irradiation.

In the pressure-sensitive adhesive optical film, the functional group-containing monomer is preferably at least one selected from a carboxyl group-containing monomer, a hydroxyl group-containing monomer, an amide group-containing monomer, and an amino group-containing monomer.

In the pressure-sensitive adhesive optical film, after the electron beam irradiation, the pressure-sensitive adhesive layer preferably has a gel fraction (E1) of 50 to 95% by weight, after the pressure-sensitive adhesive layer is allowed to stand at 23° C. for 1 hour. Further, after the electron beam irradiation, the pressure-sensitive adhesive layer preferably has a gel fraction (E2) of 30 to 95% by weight after the pressure-sensitive adhesive layer is allowed to stand at 23° C. for 1 week and then dried at 90° C. for 120 hours, and the difference (E1'-E2) between the gel fraction (E2) and the gel fraction (E1') after the pressure-sensitive adhesive layer is allowed to stand at 23° C. for 1 week is 20% by weight or less.

In the pressure-sensitive adhesive optical film, an adhesive strength of the pressure-sensitive adhesive layer is preferably 1 to 10 N/25 mm, when the pressure-sensitive adhesive layer is peeled off at a peeling angle of 90 degrees and a peeling rate of 300 mm/minute, after the pressure-sensitive adhesive layer is adhered to a non-alkali glass plate and allowed to stand at 23° C. for 1 hour. Further, an adhesive strength of the pressure-sensitive adhesive layer is preferably 3 to 20 N/25 mm, when the pressure-sensitive adhesive layer is peeled off at a peeling angle of 90 degrees and a peeling rate of 300 mm/minute, after the pressure-sensitive adhesive layer is adhered to a non-alkali glass, allowed to stand at 23° C. for 1 hour and dried at 60° C. for 48 hours.

The present invention also relates to a method for producing a release liner-carrying pressure-sensitive adhesive optical film comprising the pressure-sensitive adhesive optical film and a release liner attached to the pressure-sensitive adhesive layer of the pressure-sensitive adhesive optical film, comprising the steps of:

(1a) applying an acrylic pressure-sensitive adhesive to a release liner to form a pressure-sensitive adhesive layer, wherein the acrylic pressure-sensitive adhesive comprises a (meth)acrylic polymer comprising 50 to 99.99% by weight of an alkyl(meth)acrylate monomer unit and 0.01 to 5% by weight of a functional group-containing monomer unit;

(2a) crosslinking the pressure-sensitive adhesive layer by irradiating an electron beam to the pressure-sensitive adhesive layer from the pressure-sensitive adhesive layer side to form a crosslinked pressure-sensitive adhesive layer on the release liner; and (3a) adhering the crosslinked pressure-sensitive adhesive layer formed on the release liner to an optical film.

The present invention also relates to a method for producing a release liner-carrying pressure-sensitive adhesive optical film comprising the pressure-sensitive adhesive optical film and a release liner attached to the pressure-sensitive adhesive layer of the pressure-sensitive adhesive optical film, comprising the steps of:

(1b) applying an acrylic pressure-sensitive adhesive to a release liner to form a pressure-sensitive adhesive layer, wherein the acrylic pressure-sensitive adhesive comprises a (meth)acrylic polymer comprising 50 to 99.99% by weight of an alkyl(meth)acrylate monomer unit and 0.01 to 5% by weight of a functional group-containing monomer unit;

(2b) adhering the pressure-sensitive adhesive layer formed on the release liner to an optical film; and (3b) crosslinking the pressure-sensitive adhesive layer by irradiating an electron beam to the pressure-sensitive adhesive layer from a side where the release liner is placed so that a crosslinked pressure-sensitive adhesive layer is formed.

The present invention also relates to an image display, comprising at least one piece of the pressure-sensitive adhesive optical film.

The acrylic pressure-sensitive adhesive used to form the pressure-sensitive adhesive optical film of the present invention, wherein a (meth)acrylic polymer as a base polymer includes a functional group-containing monomer unit, and in the pressure-sensitive adhesive layer formed from the acrylic pressure-sensitive adhesive, the (meth)acrylic polymer is crosslinked by electron beam irradiation. Specifically, the (meth)acrylic polymer used as a base polymer is not crosslinked by a polyfunctional monomer, and the (meth)acrylic polymer that forms the pressure-sensitive adhesive layer has a structure crosslinked mainly by electron beam irradiation.

According to this feature of the present invention, there is provided a pressure-sensitive adhesive optical film having good reworkability from non-alkali glass (such as liquid crystal cells) and having a high level of durability and workability. Therefore, the pressure-sensitive adhesive optical film of the present invention maintains durability and allows easy peeling off of the optical film from a liquid crystal panel with no adhesive residue or no rupture of the optical film. Thus, even thin crystal panels can be prevented from being damaged, and liquid crystal panels can be effectively recycled. In addition, pressure-sensitive adhesive dropout or fouling can be prevented during working processes.

As stated above, the pressure-sensitive adhesive layer according to the present invention is formed by crosslinking the (meth)acrylic polymer by electron beam irradiation. Since radicals are formed during crosslinking by electron beam irradiation, in an oxygen atmosphere the generated radicals bond with oxygen at very high speed and cause a side reaction so that the crosslinking can be easily inhibited. Further, even when the crosslinking proceeds to a certain extent so that a desired high level of gel fraction is maintained, the gel fraction can be reduced under heating conditions so that the durability can be degraded, because degrading species are produced in the (meth)acrylic polymer. In the present invention, the pressure-sensitive adhesive layer is formed of the (meth)acrylic polymer and then irradiated with an electron beam under conditions where oxygen is hardly supplied so that the effect of oxygen itself can be as low as possible and that degradation of durability caused by gel fraction reduction can be prevented.

Further, in the present invention, the functional group-containing monomer is incorporated as a copolymerized monomer in the (meth)acrylic polymer so that crosslinked sites (radical generating points) formed by electron beam irradiation can be easily localized in side chains. Here, side chains can be introduced into the (meth)acrylic polymer by copolymerization of a polyfunctional monomer having at least two reactive double bonds. If such a polyfunctional monomer is used, however, it can be difficult to control the polymerization reaction in the process of preparing the (meth)acrylic polymer, and it can also be difficult to stably produce a high-molecular-weight product.

It is considered that in the mechanism of oxidative degradation by electron beam irradiation, the generated —O—O— bond has very low dissociation energy so that the —O—O— bond can be easily decomposed with low energy to multiply the radical concentration, and as a result, RO radicals produced in this chain process can undergo β cleavage so that the molecular weight of the polymer can be reduced. Therefore, it is considered that if crosslinking by electron beam irradiation mainly occurs at the tertiary carbon atom of the main chain of the polymer, the main chain can be cleaved so that destructive degradation of the polymer can proceed. In the present invention, the functional group-containing monomer is incorporated as a copolymerized monomer in the (meth) acrylic polymer as described above so that crosslinked sites (radical generating points) can be localized in side chains, and, therefore, destructive degradation of the (meth)acrylic polymer caused by main chain cleavage can be prevented so that durability can be maintained. The functional group-containing monomer to be incorporated as a copolymerized monomer is preferably a nitrogen-containing monomer such as an amino or amide group-containing monomer, which can exhibit the effect described above, when copolymerized in a small amount. The nitrogen-containing monomer is preferably an amino group-containing monomer, particularly preferably a tertiary amino group-containing monomer.

DETAILED DESCRIPTION OF THE PREFERRED EMBODIMENTS

A pressure-sensitive adhesive layer of the pressure-sensitive adhesive optical film of the present invention comprising is formed from an acrylic pressure-sensitive adhesive comprising a (meth)acrylic polymer comprising 30 to 99.99% by weight of an alkyl(meth)acrylate monomer unit and 0.01 to 15% by weight of a functional group-containing monomer unit.

The alkyl group of the alkyl(meth)acrylate may have about 2 to about 18 carbon atoms. The alkyl group may be a straight or branched chain. The alkyl group preferably has an average carbon atom number of 2 to 14, more preferably of 3 to 12, even more preferably of 4 to 9. As used herein, "(meth) acrylate" refers to acrylate and/or methacrylate, and "meth" has the same meaning with respect to the present invention.

Here, upon electron beam irradiation, (meth)acrylic polymer-containing acrylic pressure-sensitive adhesives can often cause a degradation reaction, at the same time causing a crosslinking reaction. The (meth)acrylic polymer means an acrylic polymer and/or a methacrylic polymer, although acrylic polymers are more likely to cause a crosslinking reaction, while methacrylic polymers are more likely to cause a degradation reaction. For this reason, in the present invention, an acrylic polymer is preferably used, and alkyl acrylate is preferably used as a monomer component. This may apply to other monomer components.

Examples of the alkyl(meth)acrylate include ethyl(meth) acrylate, n-butyl(meth)acrylate, sec-butyl(meth)acrylate, tert-butyl(meth)acrylate, isobutyl(meth)acrylate, n-pentyl (meth)acrylate, isopentyl(meth)acrylate, hexyl(meth)acrylate, heptyl(meth)acrylate, isoamyl(meth)acrylate, 2-ethylhexyl(meth)acrylate, n-octyl(meth)acrylate, isooctyl(meth) acrylate, n-nonyl(meth)acrylate, isononyl(meth)acrylate, n-decyl(meth)acrylate, isodecyl (meth)acrylate, n-dodecyl (meth)acrylate, isomyristyl(meth)acrylate, n-tridecyl(meth) acrylate, n-tetradecyl(meth)acrylate, stearyl(meth)acrylate, isostearyl(meth)acrylate, and phenoxyethyl(meth)acrylate. In particular, n-butyl(meth)acrylate and 2-ethylhexyl(meth) acrylate or the like are preferably used, and the alkyl(meth) acrylate may be used alone or in combination.

In the present invention, the amount of the alkyl(meth) acrylate is from 30 to 99.99% by weight, based on the amount of all the monomer components for the (meth)acrylic polymer. When any additional monomer other than the functional group-containing monomer is not added, the amount of the alkyl(meth)acrylate is preferably from 85 to 99.99% by weight, more preferably from 91 to 99.99% by weight, even more preferably from 95 to 99.95% by weight, still more preferably from 97 to 99.95% by weight, yet more preferably from 99 to 99.95% by weight. If the amount of the (meth) acrylic monomer is too small, the adhesion can be undesirably reduced.

A variety of functional group-containing monomers may be used as copolymerizable monomers. Examples of functional group-containing monomers include carboxyl group-containing monomers, hydroxyl group-containing monomers, amide group-containing monomers, and amino group-containing monomers. Priority is placed on terminal functional groups, when the functional group-containing monomers are classified.

As a carboxyl group-containing monomer, those having a carboxyl group and an unsaturated double bond-containing polymerizable functional group such as a (meth)acryloyl group or a vinyl group may be used without any particular limitations. Examples of the carboxyl group-containing monomer include acrylic acid, methacrylic acid, carboxyethyl(meth)acrylate, carboxypentyl(meth)acrylate, itaconic acid, maleic acid, fumaric acid, and crotonic acid. In particular, acrylic acid and methacrylic acid are preferably used.

As a hydroxyl group-containing monomer, those having a hydroxyl group and an unsaturated double bond-containing polymerizable functional group such as a (meth)acryloyl group or a vinyl group may be used without any particular limitations. Examples of the hydroxyl group-containing monomer include hydroxyalkyl(meth)acrylates such as 2-hydroxyethyl(meth)acrylate, 2-hydroxybutyl(meth)acrylate, 3-hydroxypropyl(meth)acrylate, 4-hydroxybutyl(meth)acrylate, 6-hydroxyhexyl(meth)acrylate, 8-hydroxyoctyl(meth) acrylate, 10-hydroxydecyl(meth)acrylate, and 12-hydroxylauryl(meth)acrylate; hydroxyethyl(meth)acrylamide, and other monomers such as (4-hydroxymethylcyclohexyl)methyl acrylate, N-methylol(meth)acrylamide, N-hydroxy (meth)acrylamide, allyl alcohol, 2-hydroxyethyl vinyl ether, 4-hydroxybutyl vinyl ether, diethylene glycol monovinyl ether. In particular, hydroxyalkyl(meth)acrylates are preferred.

As an amido group-containing monomer, those having an amide bond and an unsaturated double bond-containing polymerizable functional group such as a (meth)acryloyl group or a vinyl group may be used without any particular limitations. Examples of the amide group-containing monomer include (meth)acrylamide; N-substituted amide monomers such as N,N-dimethyl(meth)acrylamide, N,N-diethyl(meth)acrylamide, N-isopropyl(meth)acrylamide, N-methoxymethyl (meth)acrylamide, N-butoxymethyl(meth)acrylamide, N-vinylcaprolactam, N-acryloylmorpholine, N-acryloylpiperidine, N-methacryloylpiperidine, and N-acryloylpyrrolidine; and diacetone(meth)acrylamide and N-vinylacetamide.

As an amino group-containing monomer, those having a (meth)acryloyl group and an amino group may be used without any particular limitations. The amino group-containing monomer is preferably a tertiary amino group-containing monomer. The tertiary amino group is preferably a tertiary aminoalkyl group. Examples of the tertiary amino group-containing monomer include N,N-dialkylaminoalkyl(meth)acryamide and N,N-dialkylaminoalkyl(meth)acrylate. Specific examples of the tertiary amino group-containing monomer include N,N-dimethylaminoethyl(meth)acrylamide, N,N-dimethylaminopropyl(meth)acrylamide, N,N-diethylaminoethyl(meth)acrylamide, N,N-diethylaminopropyl(meth)acrylamide, N,N-dimethylaminoethyl(meth)acrylate, N,N-dimethylaminopropyl(meth)acrylate, N,N-diethylaminoethyl(meth)acrylate, and N,N-diethylaminopropyl(meth)acrylamide. A secondary amino group-containing monomer such as tert-butylaminoethyl(meth)acrylate may also be used.

Examples of functional group-containing monomers other than the above monomers include imide group-containing monomers such as N-cyclohexylmaleimide, N-phenylmaleimide, N-methylmaleimide, N-ethylmaleimide, N-propylmaleimide, N-isopropylmaleimide, N-butylmaleimide, and itaconimide; acid anhydride group-containing monomers such as maleic anhydride and itaconic anhydride; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate, and (meth)acryloyloxynaphthalenesulfonic acid; epoxy group-containing acrylic monomers such as glycidyl(meth)acrylate; phosphate group-containing monomers such as 2-hydroxyethylacryloyl phosphate; and cyano(meth)acrylate monomers such as acrylonitrile and methacrylonitrile.

Besides the above, a silicon atom-containing silane monomer may be exemplified as the functional group-containing monomer. Examples of the silane monomers include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

While at least one of the functional monomers listed above may be used, two or more or three or more different functional group-containing monomers may be selected and used.

As described above, the functional group-containing monomer is preferably an amino group-containing monomer. For example, a combination of two or more different functional group-containing monomers is preferably a combination of a carboxyl group-containing monomer and a hydroxyl group-containing monomer, a combination of a hydroxyl group-containing monomer and an amino group-containing monomer, a combination of a carboxyl group-containing monomer and an amino group-containing monomer, or the like. When a carboxyl group-containing monomer and a hydroxyl group-containing monomer are used as functional group-containing monomers, durability to heating can be achieved by esterification. In addition, when a carboxyl group-containing monomer and an amino group-containing monomer are used as functional group-containing monomers, durability to heating can be achieved by an acid-base reaction. For example, a combination of three or more different functional group-containing monomers is preferably such as a combination of a carboxyl group-containing monomer, a hydroxyl group-containing monomer and an amino group-containing monomer. When these functional group-containing monomers are added, a synergistic effect on the durability to heating can be achieved.

The functional group-containing monomer is used in an amount of 0.01 to 15% by weight, based on the total amount of the monomer components used to form the (meth)acrylic polymer. If the amount of the functional group-containing monomer is less than 0.01% by weight, crosslinking points for electron beam irradiation in side chains can be reduced, and it is not also preferred in view of durability. On the other hand, since a large amount of the functional group-containing monomer can produce strong interaction with non-alkali glass, the amount of the functional group-containing monomer is controlled to be 15% by weight or less in view of reworkability.

Here, when one kind of the functional group-containing monomer is used, the amount thereof is preferably from 0.01 to 5% by weight, based on the total amount of the monomer components. When different functional group-containing monomers are used, the amount of each of the functional group-containing monomers is preferably from 0.01 to 5% by weight, based on the total amount of the monomer components. The amount of one or each functional group-containing monomer is more preferably from 0.01 to 3% by weight, even more preferably from 0.05 to 1% by weight, still more preferably from 0.05 to 0.5% by weight.

Any monomer component other than the monomers described above may be used in an amount of not more than 55% by weight of the total amount of the monomers used to form the (meth)acrylic polymer, as long as it does not reduce the effects of the present invention. The amount of any other monomer is preferably 45% by weight or less, more preferably 35% by weight or less. Note in this case the amount of the alkyl(meth)acrylate is preferably 30% by weight or more, more preferably 40% by weight or more, further preferably 50% by weight or more. Examples of any other monomer include aromatic ring-containing monomers having an aromatic ring and an unsaturated double bond-containing polymerizable functional group such as a (meth)acryloyl group or a vinyl group. Examples of the aromatic ring-containing monomer include phenoxyethyl(meth)acrylate, benzyl(meth)acrylate, phenol ethylene oxide-modified (meth)acrylate, 2-naphthethyl(meth)acrylate, 2-(4-methoxy-1-naphthoxy)ethyl(meth)acrylate, phenoxypropyl(meth)acrylate, phenoxydiethylene glycol(meth)acrylate, and polystyryl(meth)acrylate.

Examples of any other monomer also include vinyl ester monomers such as vinyl acetate and vinyl propionate; aromatic monomers such as styrene and α-methylstyrene; and alkoxyalkyl(meth)acrylate monomers such as methoxyethyl(meth)acrylate and ethoxyethyl(meth)acrylate.

Generally in the present invention, the (meth)acrylic polymer preferably which has a weight average molecular weight in the range from 1,000,000 to 3,000,000 is used. In view of durability, particularly in view of heat resistance, the (meth)acrylic polymer to be used preferably has a weight average molecular weight of 1,500,000 to 2,500,000, more preferably of 1,700,000 to 2,500,000. When a weight average molecular weight is less than 1,000,000, it is not preferred in view of heat resistance. When a weight average molecular weight is more than 3,000,000, the bonding properties or the adhesive strength can reduce, thus being not preferred. The weight average molecular weight may refer to a polystyrene-equivalent weight average molecular weight measured and calculated according to gel permeation chromatography (GPC).

For the production of the (meth)acrylic polymer, any appropriate method may be selected from known production methods such as solution polymerization, bulk polymerization, emulsion polymerization, and various radical polymerization methods. The resulting (meth)acrylic polymer may be any type of copolymer such as a random copolymer, a block copolymer and a graft copolymer.

In a solution polymerization process, for example, ethyl acetate, toluene or the like is used as a polymerization solvent. In a specific solution polymerization process, for example, the reaction is performed under a stream of inert gas such as nitrogen at a temperature of about 50 to about 70° C. for about 5 to about 30 hours in the presence of a polymerization initiator.

Any appropriate polymerization initiator, chain transfer agent, emulsifying agent and so on may be selected and used for radical polymerization. The weight average molecular weight of the (meth)acrylic polymer may be controlled by the amount of addition of the polymerization initiator or the chain transfer agent or by the reaction conditions. The amount of the addition may be controlled as appropriate depending on the type of these materials.

Examples of the polymerization initiator include, but are not limited to, azo initiators such as 2,2'-azobisisobutylonitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total content of the polymerization initiator is preferably from about 0.005 to 1 part by weight, more preferably from about 0.02 to about 0.5 parts by weight, based on 100 parts by weight of the monomer.

For example, when 2,2'-azobisisobutyronitrile is used as a polymerization initiator for the production of the (meth) acrylic polymer with the above weight average molecular weight, the polymerization initiator is preferably used in a content of from about 0.06 to 0.2 parts by weight, more preferably of from about 0.08 to 0.175 parts by weight, based on 100 parts by weight of the total content of the monomer components.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. One of these chain transfer agents may be used alone, or two or more thereof may be used in a mixture. The total content of the chain transfer agent is preferably 0.1 parts by weight or less, based on 100 parts by weight of the total content of the monomer components.

Examples of the emulsifier used in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone, or two or more thereof may be used in combination.

The emulsifier may be a reactive emulsifier. Examples of such an emulsifier having an introduced radical-polymerizable functional group such as a propenyl group and an allyl ether group include Aqualon HS-10, HS-20, KH-10, BC-05, BC-10, and BC-20 (each manufactured by Dai-ichi Kogyo Seiyaku Co., Ltd.) and Adekaria Soap SE10N (manufactured by Asahi Denka Kogyo K.K.). The reactive emulsifier is preferred, because after polymerization, it can be incorporated into a polymer chain to improve water resistance. Based on 100 parts by weight of the total monomer component, the emulsifier is preferably used in a content of 0.3 to 5 parts by weight, more preferably of 0.5 to 1 parts by weight, in view of polymerization stability or mechanical stability.

A silane coupling agent may also be used for the acrylic pressure-sensitive adhesive for use in the present invention in order to increase adhesive strength or durability. Any appropriate known silane coupling agent may be used.

Examples of silane coupling agents include epoxy group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-(2-aminoethyl)-3-aminopropylmethyldimethoxysilane, and 3-triethoxysilyl-N-(1,3-dimethylbutylidene)propylamine; (meth)acrylic group-containing silane coupling agents such as 3-acryloxypropyltrimethoxysilane and 3-methacryloxypropyltriethoxysilane; and isocyanate group-containing silane coupling agents such as 3-isocyanatepropyltriethoxysilane. Such silane coupling agents are preferably used to increase durability.

The silane coupling agent may be used alone, or two or more thereof may be used in a mixture. The total content of the silane coupling agent is preferably from 0.01 to 2 parts by weight, more preferably from 0.02 to 0.6 parts by weight, still more preferably from 0.05 to 0.3 parts by weight, based on 100 parts by weight of the (meth)acrylic polymer. If the content is less than 0.01 parts by weight, it is insufficient to improve durability. If the content is more than 2 parts by weight, it may be decrease the reworkability because of too much adhesive strength to the optical member such as a liquid crystal cell.

Further, a small amount of a crosslinking agent may be added to the acrylic pressure-sensitive adhesive of the present invention in order to improve anchoring strength. As the crosslinking agent, such as an isocyanate-based crosslinking agent, an epoxy-based crosslinking agent, a peroxide-based crosslinking agent, a metal chelate-based crosslinking agent, or an oxazoline-based crosslinking agent may be used appropriately. While these crosslinking agents may be used alone or in combination of two or more kinds, among them, an isocyanate-based crosslinking agent is preferably used in view of adhesion. The content of the crosslinking agent may be 2 parts by weight or less, preferably 1.5 parts by weight or less, more preferably 1 part by weight or less, based on 100 parts by weight of the (meth)acrylic polymer.

The pressure-sensitive adhesive composition of the present invention may also contain any other known additive. For example, a tackifier, a powder such as a colorant and a pigment, a dye, a surfactant, a plasticizer, a surface lubricant, a leveling agent, a softening agent, an antioxidant, an age resister, a light stabilizer, an ultraviolet absorbing agent, a polymerization inhibitor, an inorganic or organic filler, a metal powder, or a particle- or foil-shaped material may be added as appropriate depending on the intended use. A redox system including an added reducing agent may also be used in the controllable range.

A pressure-sensitive adhesive layer of the pressure-sensitive adhesive optical film of the present invention is formed from the acrylic pressure-sensitive adhesive on at least one side of an optical film and the (meth)acrylic polymer in the acrylic pressure-sensitive adhesive is crosslinked by irradiation with electron beam.

For example, the pressure-sensitive adhesive optical film may be produced by a method of producing a release liner-carrying pressure-sensitive adhesive optical film that includes a pressure-sensitive adhesive optical film and a release liner placed on the pressure-sensitive adhesive layer of the pressure-sensitive adhesive optical film. The release liner-carrying pressure-sensitive adhesive optical film may be produced by the method (A) or the method (B) described below.

The method (A) includes the steps of: (1a) applying the prepared (meth)acrylic pressure-sensitive adhesive to a release liner to form a pressure-sensitive adhesive layer; (2a) crosslinking the pressure-sensitive adhesive layer by irradiating an electron beam to the pressure-sensitive adhesive layer from the pressure-sensitive adhesive layer side to form a crosslinked pressure-sensitive adhesive layer on the release liner; and (3a) adhering the crosslinked pressure-sensitive adhesive layer formed on the release liner to an optical film.

The method (B) includes the steps of: (1b) applying the prepared (meth)acrylic pressure-sensitive adhesive to a release liner to form a pressure-sensitive adhesive layer; (2b) adhering the pressure-sensitive adhesive layer formed on the release liner to an optical film; and (3b) crosslinking the pressure-sensitive adhesive layer by irradiating an electron beam to the pressure-sensitive adhesive layer from a side where the release liner is placed so that a crosslinked pressure-sensitive adhesive layer is formed.

In each of the steps (1a) and (2a), the (meth)acrylic pressure-sensitive adhesive is applied to the release liner to form a pressure-sensitive adhesive layer. When the acrylic pressure-sensitive adhesive contains no crosslinking agent, an uncrosslinked pressure-sensitive adhesive layer is formed, which is then crosslinked by electron beam irradiation in a later process.

Examples of the material for forming the release liner include a plastic film such as a polyethylene, polypropylene, polyethylene terephthalate, or polyester film, a porous material such as paper, cloth and nonwoven fabric, and an appropriate thin material such as a net, a foamed sheet, a metal foil, and a laminate thereof. In particular, a plastic film is preferably used, because of its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the release liner is generally from about 5 to about 200 µm, preferably from about 5 to about 100 µm. If necessary, the release liner may be treated with a release agent such as a silicone, fluorine, long-chain alkyl, or fatty acid amide release agent, or may be subjected to release and antifouling treatment with silica powder or to antistatic treatment of coating type, kneading and mixing type, vapor-deposition type, or the like. In particular, if the surface of the release liner is appropriately subjected to release treatment such as silicone treatment, long-chain alkyl treatment, and fluorine treatment, the releasability from the pressure-sensitive adhesive layer can be further increased.

After the pressure-sensitive adhesive optical film is prepared, the release liner may be used as it is as a separator for the pressure-sensitive adhesive optical film so that the process can be simplified.

Various methods may be used to apply the acrylic pressure-sensitive adhesive to the release liner. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater, a fountain coater or the like.

A coating is formed on the release liner by the application step. The acrylic pressure-sensitive adhesive is generally used in the form of a solution. In such a case, the coating is generally subjected to drying. Before the application, any appropriate solvent may be further added. In general, the drying temperature is preferably from 40 to 120° C., more preferably from 40 to 100° C., particularly preferably from 45 to 85° C., depending on the type of the solvent used in the solution. Any appropriate drying time may be used. The drying time is preferably from 5 seconds to 20 minutes, more preferably from 5 seconds to 10 minutes, particularly preferably from 10 seconds to 5 minutes. If the drying temperature and the drying time are each set in the above range, the solvent can be removed from the coating by drying with no side reaction, so that a pressure-sensitive adhesive layer with good pressure-sensitive adhesive properties can be obtained.

In the production method (A), the step (1a) is followed by the step (2a) of crosslinking the pressure-sensitive adhesive layer by irradiating an electron beam to the pressure-sensitive adhesive layer from the pressure-sensitive adhesive layer side to form a crosslinked pressure-sensitive adhesive layer on the release liner. The electron beam irradiation is preferably performed at a dose of 2 to 100 kGy, more preferably of 2 to 70 kGy, particularly preferably of 5 to 50 kGy.

The conditions for the electron beam irradiation are preferably set such that the crosslinking reaction preferentially occurs. Examples of methods for setting such conditions include a method of performing electron beam irradiation under heating, a method of irradiating electron beams in the presence of water, and a method of performing electron beam irradiation under conditions where oxygen is hardly supplied (such as nitrogen purge conditions). In a preferred mode, any of these methods is appropriately selected and performed. In an embodiment of the present invention, the irradiation is preferably performed under conditions where oxygen is hardly supplied, because such irradiation is simple and convenient.

In the step (3a) of the production method (A), the crosslinked pressure-sensitive adhesive layer formed on the release liner is adhered to an optical film so that a release liner-carrying pressure-sensitive adhesive optical film is obtained. Before the adhering step (3a), the surface of the optical film may be coated with an anchor layer or subjected to any of various adhesion facilitating treatments such as corona treatment and plasma treatment. The surface of the pressure-sensitive adhesive layer may also be subjected to adhesion facilitating treatment.

In the production method (B), the step (1b) is followed by the step (2b) of adhering the pressure-sensitive adhesive layer formed on the release liner to an optical film. Before the step (2b), the optical film and/or the pressure-sensitive adhesive layer may also be subjected to adhesion facilitating treatment as described above.

In the step (3b) of the production method (B), thereafter, crosslinking the pressure-sensitive adhesive layer by irradiating an electron beam to the pressure-sensitive adhesive layer from a side where the release liner is placed so that a crosslinked pressure-sensitive adhesive layer is formed and that a release liner-carrying pressure-sensitive adhesive optical film is obtained. The electron beam irradiation is preferably performed the same as that described above at a dose of 2 to 100 kGy, more preferably of 2 to 70 kGy, particularly preferably of 5 to 50 kGy.

Besides the above production methods, another method may be used, for example, which includes applying the acrylic pressure-sensitive adhesive to an optical film, removing the solvent and so on by drying to form a pressure-sensitive adhesive layer on the optical film, and then irradiating an electron beam to the pressure-sensitive adhesive layer.

The pressure-sensitive adhesive layer of the pressure-sensitive adhesive optical film obtained as described above generally has a thickness of about 2 to about 50 μm, preferably of 2 to 40 μm, more preferably of 5 to 35 μm.

After the electron beam irradiation, the pressure-sensitive adhesive layer preferably has a gel fraction (E1) of 50 to 95% by weight, more preferably of 60 to 95% by weight, particularly preferably of 70 to 95% by weight, after the pressure-sensitive adhesive layer is allowed to stand at 23° C. for 1 hour.

In addition, after the electron beam irradiation, the pressure-sensitive adhesive layer preferably has a gel fraction (E2) of 30 to 95% by weight, more preferably of 40 to 95% by weight, particularly preferably of 50 to 95% by weight, after the pressure-sensitive adhesive layer is allowed to stand at 23° C. for 1 week and then dried at 90° C. for 120 hours.

Further, the difference (E1'-E2) between the gel fraction (E2) and the gel fraction (E1') after the pressure-sensitive adhesive layer is allowed to stand at 23° C. for 1 week is preferably 20% by weight or less, more preferably 15% by weight or less, particularly preferably 5% by weight or less, most preferably 1% by weight or less. Here, the gel fraction (E1') is preferably from 50 to 95% by weight, more preferably from 60 to 95% by weight, particularly preferably from 70 to 95% by weight.

In general, both too high and too low gel fractions of the pressure-sensitive adhesive layer tend to make durability unsatisfactory. If the gel fraction is too high, the pressure-sensitive adhesive layer may fail to withstand dimensional changes of the optical film due to shrinkage or expansion particularly under humidifying conditions so that troubles such as separation from a liquid crystal cell can easily occur. If the gel fraction is too low, defects such as foaming between a liquid crystal cell and the pressure-sensitive adhesive layer can easily occur particularly under heating conditions. In view of the durability, therefore, the pressure-sensitive adhesive layer of the pressure-sensitive adhesive optical film of the present invention preferably has a gel fraction in the above range and preferably shows less change in gel fraction over time.

Further, after the pressure-sensitive adhesive layer is adhered to a non-alkali glass and allowed to stand at 23° C. for 1 hour, it preferably exhibits an adhesive strength of 1 to 10 N/25 mm, more preferably of 1 to 8 N/25 mm, particularly preferably of 2 to 7 N/25 mm, when the pressure-sensitive adhesive layer is peeled off at a peeling angle of 90 degrees and a peeling rate of 300 mm/minute.

Further, after the pressure-sensitive adhesive layer is adhered to a non-alkali glass, allowed to stand at 23° C. for 1 hour and dried at 60° C. for 48 hours, it preferably exhibits an adhesive strength of 3 to 20 N/25 mm, more preferably of 3 to 18 N/25 mm, particularly preferably of 3 to 15 N/25 mm, when the pressure-sensitive adhesive layer is peeled off at a peeling angle of 90 degrees and a peeling rate of 300 mm/minute.

In view of reworkability and workability, the adhesive strength of the pressure-sensitive adhesive layer is preferably in the above range, and the pressure-sensitive adhesive layer preferably shows less change in adhesive strength over time.

The optical film may be of any type for use in forming image displays such as liquid crystal displays. For example, a polarizing plate is exemplified as the optical film. A polarizing plate including a polarizer and a transparent protective film provided on one or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive.

Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to 500 μm from the viewpoint of a strength, workability such as handlability, requirement for a thin film and the like. Especially, the thickness is preferably in the range of from 1 to 300 μm and more preferably in the range of from 5 to 200 μm. Therefore, it is particularly preferred that the transparent protective film has a thickness of 5 to 150 μm.

Note that in a case where the transparent protective films are provided on both sides of a polarizer, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film according to the present invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-(meth)acrylate-(meth)acrylic acid copolymers, methyl(meth)acrylate-styrene copolymers (such as MS resins), and alicyclic hydrocarbon group-containing polymers (such as methyl methacrylate-cyclohexyl methacrylate copolymers and methyl methacrylate-norbornyl(meth)acrylate copolymers). Poly($C_{1-6}$ alkyl(meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth) acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (I):

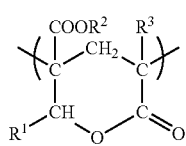

[Formula 1]

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth) acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has an in-plane retardation of less than 40 nm and a thickness direction retardation of less than 80 nm. The in-plane retardation Re is expressed by the formula Re=(nx−ny)×d, the thickness direction retardation Rth is expressed by the formula Rth=(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to 150 μm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

A retardation plate satisfying the relation: nx=ny>nz, nx>ny=nz, nx>ny=nz, nx>nz>ny, nz=nx>ny, nz>nx>ny, or nz>nx=ny may be selected and used depending on various applications. The relation ny=nz includes not only the case where ny is completely equal to nz but also the case where ny is substantially equal to nz.

For example, the retardation plate satisfying the relation nx>ny>nz to be used preferably has a in-plane retardation of 40 to 100 nm, a thickness retardation of 100 to 320 nm, and an Nz coefficient of 1.8 to 4.5. For example, the retardation plate satisfying the relation nx>ny=nz (positive A plate) to be used preferably has a in-plane retardation of 100 to 200 nm. For example, the retardation plate satisfying the relation nz=nx>ny (negative A plate) to be used preferably has a in-plane retardation of 100 to 200 nm. For example, the retardation plate satisfying the relation nx>nz>ny to be used preferably has a in-plane retardation of 150 to 300 nm and an Nz coefficient of more than 0 and not more than 0.7. As described above, for example, the retardation plate satisfying the relation nx=ny>nz, nz>nx>ny or nz>nx=ny may also be used.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (uniaxial, biaxial, Z conversion, negative C-plate) is preferred. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS (In-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, Z conversion on the upper side with no retardation on the lower side or an A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, nx>ny=nz, nx>nz>ny, nz>nx=ny, or nz>nx>ny (uniaxial, Z conversion, positive C-plate, positive A-plate) is preferred.

The film with retardation may be separately prepared and laminated to a transparent protective film with no retardation so that the function described above can be provided.

The polarizer or the transparent protective film may be subjected to surface modification treatment before it is applied with the adhesive. Specific examples of such treatment include corona treatment, plasma treatment, primer treatment, saponification treatment, and coupling agent treatment.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer, which is exemplified such as diffusion layer of backlight side.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface, and preferably 5 to 50 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

An adhesive may be used to bond the polarizer to the transparent protective film. Examples of the adhesive include isocyanate adhesives, polyvinyl alcohol adhesives, gelatin adhesives, vinyl adhesives, latex adhesives, and aqueous polyester adhesives. The adhesive is generally used in the form of an aqueous solution generally having a solids content of 0.5 to 60% by weight. Besides the above adhesives, ultraviolet-curable adhesives, electron beam-curable adhesives or the like may also be used to bond the polarizer to the transparent protective film. Electron beam-curable adhesives for polarizing plates exhibit good adhesion to the above different types of transparent protective films. Adhesives that may be used in an embodiment of the present invention may also contain a metal compound filler.

Further an optical film of the present invention may be used as other optical layers, such as a reflective plate, a transflective plate, a retardation plate (a half wavelength plate and a quarter wavelength plate included), and a viewing angle compensation film, which may be used for formation of a liquid crystal display etc. These are used in practice as an optical film, or as one layer or two layers or more of optical layers laminated with polarizing plate.

Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the transparent protective film, on which a reflective layer of concavo-convex structure is prepared, may be mentioned. The reflective layer that has the fine concavo-convex structure diffuses incident light by random reflection to prevent directivity and glaring appearance, and has an advantage of controlling unevenness of light and darkness etc. Moreover, the transparent protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarization plate is effectively used to give a monochrome display without the coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

The elliptically polarization plate and the reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bidirectional stretching and a biaxially stretched film as inclined orientation film etc. may be used. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the separated type polarization plate. Therefore, a polarization plate may be a reflection type elliptically polarization plate or a semi-transmission type elliptically polarization plate, etc. in which the reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as a pressure-sensitive adhesive layer, may be used for laminating. On the occasion of adhesion of the above described polarizing plate and other optical layers, the optical axis may be set as a suitable configuration angle according to the target retardation characteristics etc.

In addition, ultraviolet absorbing property may be given to the each layer of the optical film and the pressure-sensitive adhesive layer etc. of the pressure-sensitive adhesive optical film of the present invention, using a method of adding UV absorbents, such as salicylic acid ester type compounds, benzophenol type compounds, benzotriazol type compounds, cyano acrylate type compounds, and nickel complex salt type compounds.

The pressure-sensitive adhesive optical film of the present invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive optical film and optionally other component such as a lighting system and incorporating a driving circuit according to any conventional technique, except that the pressure-sensitive adhesive optical film of the present invention is used. Any type of liquid crystal cell may also be used such as a TN type, an STN type, a π type a VA type and IPS type.

Suitable liquid crystal displays, such as liquid crystal display with which the pressure-sensitive adhesive optical film has been located at one side or both sides of the liquid crystal cell, and with which a backlight or a reflective plate is used for a lighting system may be manufactured. In this case, the optical film may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to π/4, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

The present invention is more specifically described using the examples below, which are not intended to limit the scope of the present invention. In each example, "part or parts" and "%" are all by weight, unless otherwise stated. The evaluation items in the examples and so on were measured as described below.

<Measurement of Weight Average Molecular Weight>

The weight average molecular weight of the resulting (meth)acrylic polymer was measured by gel permeation chromatography (GPC). The polymer sample was dissolved in dimethylformamide to form a 0.1% by weight solution. The solution was allowed to stand overnight and then filtered through a 0.45 μm membrane filter, and the resulting filtrate was used under the following conditions: analyzer, HLC-8120GPC manufactured by Tosoh Corporation; column, Super AWM-H, AW4000, AW2500, manufactured by Tosoh Corporation; column size, each 6.0 mmφ×150 mm; eluent, a dimethylformamide solution of 30 mM lithium bromide and 30 mM phosphoric acid; flow rate, 0.4 ml/minute; detector, differential refractometer (RI); column temperature, 40° C.; injection volume, 20 μl.

(Preparation of Polarizing Plate)

An 80 μm-thick polyvinyl alcohol film was stretched to 3 times between rolls different in velocity ratio, while it was dyed in a 0.3% iodine solution at 30° C. for 1 minute. The film was then stretched to a total stretch ratio of 6 times, while it was immersed in an aqueous solution containing 4% of boric acid and 10% of potassium iodide at 60° C. for 0.5 minutes. The film was then washed by immersion in an aqueous solution containing 1.5% of potassium iodide at 30° C. for 10 seconds and then dried at 50° C. for 4 minutes to give a polarizer. An 80 μm-thick saponified triacetylcellulose film was bonded to both sides of the polarizer with a polyvinyl alcohol adhesive to form a polarizing plate.

Example 1

Preparation of Acrylic Polymer

To a four-neck flask equipped with a stirring blade, a thermometer, a nitrogen gas introducing tube, and a condenser were added 99 parts of butyl acrylate, 1 part of 2-hydroxybutyl acrylate, 0.3 parts of 2,2'-azobisisobutyronitrile as a polymerization initiator, and 200 parts of ethyl acetate. Nitrogen gas was introduced to replace the air, while the mixture was gently stirred, and then a polymerization reaction was performed for 4 hours, while the temperature of the liquid in the flask was kept at about 60° C., so that a solution of an acrylic polymer was prepared. The acrylic polymer had a weight average molecular weight of 2,110,000.

<Preparation of Acrylic Pressure-Sensitive Adhesive>

Ethyl acetate was further added to the resulting acrylic polymer to form an acrylic polymer solution with a total solid content concentration of 30%. Based on 100 parts of the solid content of the acrylic polymer solution, 0.1 parts of N-phenyl-γ-aminopropyltrimethoxysilane (KBM573 manufactured by Shin-Etsu Chemical Co., Ltd.) was added to the acrylic polymer solution so that an acrylic pressure-sensitive adhesive solution was prepared.

<Production of Pressure-Sensitive Adhesive Polarizing Plate>

The acrylic pressure-sensitive adhesive solution was then uniformly applied to the release-treated surface of a silicone release agent-treated polyethylene terephthalate film (a release liner, MRF38 manufactured by Mitsubishi Polyester Film Corp.) with a fountain coater. The coating was then dried in an air circulation type thermostatic oven at 75° C. for 2 minutes to form a 20 μm-thick pressure-sensitive adhesive layer. The pressure-sensitive adhesive layer formed on the release-treated surface of the release liner was then irradiated with electron beam (dose: 15 kGy). The pressure-sensitive adhesive layer placed on the release liner was then adhered to the polarizing plate so that a release liner-carrying pressure-sensitive adhesive polarizing plate was prepared.

Examples 2 to 23

Acrylic polymer solutions, acrylic pressure-sensitive adhesives and release liner-carrying pressure-sensitive adhesive polarizing plates were prepared in the same manner as in Example 1, except that at least one of the kind and the amount of the monomer components in the process of preparing the acrylic polymer or the drying temperature of the pressure-sensitive adhesive layer or the dose of the electron beam irradiation in the process of producing the pressure-sensitive adhesive polarizing plate was changed as shown in Table 1. Here, the weight average molecular weight of the acrylic polymer obtained in each example is shown in Table 1.

Example 24

Preparation of Acrylic Polymer and Acrylic Pressure-Sensitive Adhesive

An acrylic polymer solution and an acrylic pressure-sensitive adhesive were prepared in the same manner as in Example 1, except that at least one of the kind and the amount of the monomer components in the process of preparing the acrylic polymer was changed as shown in Table 1. Here, the weight average molecular weight of the resulting acrylic polymer is shown in Table 1.

<Production of Pressure-Sensitive Adhesive Polarizing Plate>

The acrylic pressure-sensitive adhesive solution was then uniformly applied to the release-treated surface of a silicone release agent-treated polyethylene terephthalate film (a release liner, MRF38 manufactured by Mitsubishi Polyester Film Corp.) with a fountain coater. The coating was then dried in an air circulation type thermostatic oven at 75° C. for 2 minutes to form a 20 μm-thick pressure-sensitive adhesive layer. The pressure-sensitive adhesive layer placed on the release liner was adhered to the polarizing plate, the pressure-sensitive adhesive layer was then irradiated with electron beam (dose: 15 kGy) from the release liner side so that a release liner-carrying pressure-sensitive adhesive polarizing plate was prepared.

Comparative Example 1

Preparation of Acrylic Pressure-Sensitive Adhesive

An acrylic polymer was obtained in the same manner as in Example 4. Ethyl acetate was further added to the resulting acrylic polymer to prepare an acrylic polymer solution with a total solid content concentration of 30%. Based on 100 parts of the solid content of the acrylic polymer solution, 0.15 parts of trimethylolpropane-xylene diisocyanate (TAKENATE D-110N manufactured by Mitsui Takeda Chemicals, Inc.) and 0.1 parts of N-phenyl-γ-aminopropyltrimethoxysilane (KBM573 manufactured by Shin-Etsu Chemical Co., Ltd.) were added to the acrylic polymer solution so that an acrylic pressure-sensitive adhesive solution was prepared.
<Production of Pressure-Sensitive Adhesive Polarizing Plate>
The acrylic pressure-sensitive adhesive solution prepared above was then uniformly applied to the release-treated surface of a silicone release agent-treated polyethylene terephthalate film (a release liner, MRF38 manufactured by Mitsubishi Polyester Film Corp.) with a fountain coater. The coating was then dried in an air circulation type thermostatic oven at 75° C. for 2 minutes to form a 20 μm-thick pressure-sensitive adhesive layer. The pressure-sensitive adhesive layer placed on the release liner was then adhered to the polarizing plate so that a release liner-carrying pressure-sensitive adhesive polarizing plate was prepared.

Comparative Example 2

Preparation of Acrylic Polymer

To a four-neck flask equipped with a stirring blade, a thermometer, a nitrogen gas introducing tube, and a condenser were added 100 parts of butyl acrylate, 0.3 parts of 2,2'-azobisisobutyronitrile as a polymerization initiator, and 200 parts of ethyl acetate. Nitrogen gas was introduced to replace the air, while the mixture was gently stirred, and then a polymerization reaction was performed for 4 hours, while the temperature of the liquid in the flask was kept at about 60° C., so that a solution of an acrylic polymer was prepared. The acrylic polymer had a weight average molecular weight of 2,370,000.
<Preparation of Acrylic Pressure-Sensitive Adhesive and Production of Pressure-Sensitive Adhesive Polarizing Plate>
In Example 1, an acrylic pressure-sensitive adhesive was prepared and a release liner-carrying pressure-sensitive adhesive polarizing plate was produced in the same manner as in Example 1, except that the acrylic polymer obtained above was used as an acrylic polymer.

Comparative Example 3

Preparation of Acrylic Pressure-Sensitive Adhesive

An acrylic polymer was obtained in the same manner as in Comparative Example 2. Ethyl acetate was further added to the resulting acrylic polymer to prepare an acrylic polymer solution with a total solid content concentration of 30%. Based on 100 parts of the solid content of the acrylic polymer solution, 0.3 parts of dibenzoyl peroxide (NYPER BMT 40 (SV) manufactured by NOF CORPORATION) and 0.1 parts of N-phenyl-γ-aminopropyltrimethoxysilane (KBM573 manufactured by Shin-Etsu Chemical Co., Ltd.) were added to the acrylic polymer solution so that an acrylic pressure-sensitive adhesive solution was prepared.
<Production of Pressure-Sensitive Adhesive Polarizing Plate>
The acrylic pressure-sensitive adhesive solution prepared above was then uniformly applied to the release-treated surface of a silicone release agent-treated polyethylene terephthalate film (a release liner, MRF38 manufactured by Mitsubishi Polyester Film Corp.) with a fountain coater. The coating was then dried in an air circulation type thermostatic oven at 155° C. for 2 minutes to form a 20 μm-thick pressure-sensitive adhesive layer. The pressure-sensitive adhesive layer placed on the release liner was then adhered to the polarizing plate so that a release liner-carrying pressure-sensitive adhesive polarizing plate was prepared.

Comparative Example 4

Preparation of Acrylic Pressure-Sensitive Adhesive

An acrylic polymer was obtained in the same manner as in Example 1. Ethyl acetate was further added to the resulting acrylic polymer to prepare an acrylic polymer solution with a total solid content concentration of 30%. Based on 100 parts of the solid content of the acrylic polymer solution, 0.3 parts of dibenzoyl peroxide (NYPER BMT 40 (SV) manufactured by NOF CORPORATION) and 0.1 parts of N-phenyl-γ-aminopropyltrimethoxysilane (KBM573 manufactured by Shin-Etsu Chemical Co., Ltd.) were added to the acrylic polymer solution so that an acrylic pressure-sensitive adhesive solution was prepared.
<Production of Pressure-Sensitive Adhesive Polarizing Plate>
The acrylic pressure-sensitive adhesive solution prepared as described above was used to form a pressure-sensitive adhesive layer on a release liner in the same manner as in Comparative Example 3. The pressure-sensitive adhesive layer placed on the release liner was then bonded to the polarizing plate so that a release liner-carrying pressure-sensitive adhesive polarizing plate was produced.

Comparative Example 5

Preparation of Acrylic Pressure-Sensitive Adhesive

An acrylic polymer was obtained in the same manner as in Example 4. Ethyl acetate was further added to the resulting acrylic polymer to prepare an acrylic polymer solution with a total solid content concentration of 30%. Based on 100 parts of the solid content of the acrylic polymer solution, 0.1 parts of N-phenyl-γ-aminopropyltrimethoxysilane (KBM573 manufactured by Shin-Etsu Chemical Co., Ltd.) was added to the acrylic polymer solution so that an acrylic pressure-sensitive adhesive solution was prepared.
<Production of Pressure-Sensitive Adhesive Polarizing Plate>
The acrylic pressure-sensitive adhesive solution prepared as described above was used to form a pressure-sensitive adhesive layer on a release liner in the same manner as in Comparative Example 3. The pressure-sensitive adhesive layer placed on the release liner was then bonded to the polarizing plate so that a release liner-carrying pressure-sensitive adhesive polarizing plate was produced.

Comparative Example 6

Preparation of Acrylic Pressure-Sensitive Adhesive

An acrylic polymer was obtained in the same manner as in Example 14. Ethyl acetate was further added to the resulting acrylic polymer to prepare an acrylic polymer solution with a total solid content concentration of 30%. Based on 100 parts of the solid content of the acrylic polymer solution, 0.3 parts of dibenzoyl peroxide (NYPER BMT 40 (SV) manufactured by NOF CORPORATION) and 0.1 parts of N-phenyl-γ-aminopropyltrimethoxysilane (KBM573 manufactured by Shin-Etsu Chemical Co., Ltd.) were added to the acrylic polymer solution so that an acrylic pressure-sensitive adhesive solution was prepared.

<Production of Pressure-Sensitive Adhesive Polarizing Plate>

The acrylic pressure-sensitive adhesive solution prepared as described above was used to form a pressure-sensitive adhesive layer on a release liner in the same manner as in Comparative Example 3. The pressure-sensitive adhesive layer placed on the release liner was then bonded to the polarizing plate so that a release liner-carrying pressure-sensitive adhesive polarizing plate was produced.

The release liner was removed from the release liner-carrying pressure-sensitive adhesive polarizing plate obtained in each of the examples and the comparative examples, and the resulting article (sample) was evaluated as described below. The results of the evaluation are shown in Table 2.

<Gel Fraction>

The gel fraction of the pressure-sensitive adhesive layer was measured as described below. W1 (g) (in dry weight) of the pressure-sensitive adhesive layer was sampled and immersed in ethyl acetate. The insoluble part of the pressure-sensitive adhesive layer sample was then taken out of the ethyl acetate, dried and then weighed (W2 (g)). The value calculated according to the formula (W2/W1)×100 was determined as the gel fraction (% by weight). More specifically, the gel fraction was determined as described below. W1 (g) (about 500 mg) of the crosslinked pressure-sensitive adhesive layer was sampled. The pressure-sensitive adhesive layer sample was then immersed in ethyl acetate at 23° C. for 7 days. The pressure-sensitive adhesive layer sample was then taken out, dried at 130° C. for 2 hours, and then weighed (W2 (g)). W1 and W2 were substituted into the formula so that the gel fraction (% by weight) was determined. After the formation of the pressure-sensitive adhesive layer, the gel fraction was measured after the aging described below.

*1: the gel fraction (E1) after standing at 23° C. for 1 hour;
*2: the gel fraction after standing at 23° C. for 24 hours;
*3: the gel fraction (E1') after standing at 23° C. for 1 week;
*4: the gel fraction (E2) after standing at 23° C. for 1 hour and then drying at 90° C. for 120 hours.

Here, after the formation of the pressure-sensitive adhesive layer means "after the electron beam irradiation was completed" in the case of Examples or "after the pressure-sensitive adhesive layer was formed by drying" in the case of Comparative Examples.

<Measurement of Adhesive Strength>

The sample was cut into 25 mm-wide pieces. The sample piece was press-adhered to a non-alkali glass (1737 manufactured by Corning Incorporated) having a thickness of 0.7 mm by one reciprocation of a 2 kg roller and then aged at 23° C. for 1 hour. The adhesive strength (N/25 cm) was measured when the sample piece was peeled off at a peeling angle of 90° and a peeling rate of 300 mm/minute with a tensile tester. Further, after the sample piece was allowed to stand at 23° C. for 1 hour and then dried at 60° C. for 48 hours, the adhesive strength (N/25 cm) was also measured in the same method as described above.

<Reworkability>

The sample was cut into 420 mm long×320 mm wide pieces. The sample pieces were then attached with a laminator to both sides of a 0.7 mm-thick non-alkali glass plate (1737 manufactured by Corning Incorporated) in the crossed Nicol arrangement. The sample laminate was autoclaved at 50° C. and 0.5 Mpa for 15 minutes and then dried at 60° C. for 48 hours so that the sample pieces were completely adhered to the non-alkali glass. The sample pieces were then peeled off by hand from the non-alkali glass, and reworkability was evaluated according to the criteria described below. In the evaluation of the reworkability, three sample laminates were prepared by the procedure described above, and the peeling process was repeated three times.

⊙: Sample pieces were successfully peeled off from all the three laminates with no adhesive residue or no film rupture;
○: Film rupture occurred in one of the three laminates, but the film was successfully peeled off by re-peeling;
Δ: Film rupture occurred in all the three laminates, but each film was successfully peeled off by re-peeling;
x: In all three laminates, some adhesive residue was left, or films were ruptured and were not successfully peeled off every time peeling was performed.

<Durability>

The sample was cut into 420 mm×240 mm pieces. The sample pieces were then attached with a laminator to both sides of a 0.7 mm-thick non-alkali glass plate (1737 manufactured by Corning Incorporated) in the crossed Nicol arrangement. The sample laminate was autoclaved at 50° C. and 0.5 Mpa for 15 minutes so that the sample pieces were completely adhered to the non-alkali glass plate. After this process, the sample laminate was stored for 500 hours at 80° C., 90° C., 95° C., 100° C., or 60° C./90% RH, and then foaming, peeling or separation was visually evaluated according to the following criteria.

○: Neither foaming, peeling nor separation was observed;
Δ: Foaming, peeling or separation was at a practically acceptable level but visually at a slightly poor level;
x: Practically unacceptable foaming, peeling or separation was observed.

<Workability>

Within 24 hours after the sample was prepared, 100 square pieces each with a side of 270 mm were obtained from the sample by punching. The operator evaluated the 100 pieces by visual observation and by touching with the hand with respect to whether or not the side of the polarizing plate had a sticky feeling or whether or not the surface of the polarizing plate was stained with the pressure-sensitive adhesive. How many pieces had a sticky feeling or a stain was determined, and evaluation was performed according to the following criteria.

○: None of the 100 pieces had a sticky feeling or a stain;
Δ: One to five of the 100 pieces had a sticky feeling or a stain;
x: Six or more of the 100 pieces had a sticky feeling or a stain.

TABLE 1

| | Monomer Components | | | | | | | | Monomer Components Additional | | Weight Average Molecular Weight (×10⁴) | Crosslinking Agents | | Conditions for Forming Pressure-Sensitive Adhesive Layer | | |
|---|---|---|---|---|---|---|---|---|---|---|---|---|---|---|---|---|
| | Alkyl (Meth)acrylate | Functional Group-Containing Monomer | | | | | | | | | | | | Drying Conditions | | Electron Beam Irradiation |
| | | Hydroxyl Group-Containing Monomer | | | | Carboxyl Group-Containing Monomer | Amino Group-Containing Monomer | Amide Group-Containing Monomer | | | | | | | | |
| | BA (parts) | 2HEA (parts) | 4HBA (parts) | 6HHA (parts) | HEAA (parts) | AA (parts) | DMAEA (parts) | NIPAM (parts) | PEA (parts) | BzA (parts) | | Isocyanate Compound (parts) | Peroxide (parts) | Temperature (°C.) | Time (minutes) | Dose (kGy) |
| Example 1 | 99 | 1 | — | — | — | — | — | — | — | — | 211 | — | — | 75 | 2 | 15 |
| Example 2 | 99.9 | — | 0.1 | — | — | — | — | — | — | — | 195 | — | — | 75 | 2 | 15 |
| Example 3 | 99.5 | — | — | 0.5 | — | — | — | — | — | — | 185 | — | — | 75 | 2 | 15 |
| Example 4 | 99 | — | 1 | — | — | — | — | — | — | — | 192 | — | — | 75 | 2 | 10 |
| Example 5 | 99 | — | 1 | — | — | — | — | — | — | — | 192 | — | — | 75 | 2 | 15 |
| Example 6 | 99 | — | 1 | — | — | — | — | — | — | — | 192 | — | — | 75 | 2 | 30 |
| Example 7 | 99 | — | 1 | — | — | — | — | — | — | — | 192 | — | — | 100 | 2 | 15 |
| Example 8 | 99 | — | 1 | — | — | — | — | — | — | — | 192 | — | — | 120 | 2 | 15 |
| Example 9 | 99 | — | 1 | — | — | — | — | — | — | — | 247 | — | — | 75 | 2 | 15 |
| Example 10 | 99.95 | — | — | — | 0.05 | — | — | — | — | — | 181 | — | — | 75 | 2 | 15 |
| Example 11 | 99.5 | — | — | — | — | 0.5 | — | — | — | — | 221 | — | — | 75 | 2 | 15 |
| Example 12 | 97.4 | — | — | — | — | 2.6 | — | — | — | — | 200 | — | — | 75 | 2 | 15 |
| Example 13 | 99.9 | — | — | — | — | — | 0.1 | — | — | — | 180 | — | — | 75 | 2 | 15 |
| Example 14 | 99 | — | — | — | — | — | 1 | — | — | — | 175 | — | — | 75 | 2 | 15 |
| Example 15 | 99.92 | — | — | — | — | — | — | 0.08 | — | — | 249 | — | — | 75 | 2 | 15 |
| Example 16 | 99.2 | — | — | — | — | — | — | 0.8 | — | — | 243 | — | — | 75 | 2 | 15 |
| Example 17 | 94.9 | 0.1 | — | — | — | 5 | — | — | — | — | 220 | — | — | 75 | 2 | 15 |
| Example 18 | 99.4 | — | 0.1 | — | — | 0.5 | — | — | — | — | 177 | — | — | 75 | 2 | 15 |
| Example 19 | 99.8 | — | 0.1 | — | — | — | 0.1 | — | | | | | | | | |
| Example 20 | 99.8 | — | — | — | — | 0.1 | 0.1 | — | | | | | | | | |
| Example 21 | 99.7 | — | 0.1 | — | — | 0.1 | 0.1 | — | | | | | | | | |
| Example 22 | 69.7 | — | 0.1 | — | — | 0.1 | 0.1 | — | | | | | | | | |
| Example 23 | 73.05 | — | 1 | — | — | — | 0.05 | — | | | | | | | | |
| Example 24 | 99.7 | — | 0.1 | — | — | 0.1 | 0.1 | — | | | | | | | | |
| Comparative Example 1 | 99 | — | 1 | — | — | — | — | — | | | | | | | | |
| Comparative Example 2 | 100 | — | — | — | — | — | — | — | | | | | | | | |
| Comparative Example 3 | 100 | — | — | — | — | — | — | — | | | | | | | | |
| Comparative Example 4 | 99 | 1 | — | — | — | — | — | — | | | | | | | | |
| Comparative Example 5 | 99 | — | 1 | — | — | — | — | — | | | | | | | | |
| Comparative Example 6 | 99 | — | — | — | — | — | 1 | — | | | | | | | | |

TABLE 1-continued

| | | | | | | | | |
|---|---|---|---|---|---|---|---|---|
| Example 19 | — | — | 200 | — | — | 75 | 2 | 15 |
| Example 20 | — | — | 175 | — | — | 75 | 2 | 15 |
| Example 21 | — | — | 184 | — | — | 75 | 2 | 15 |
| Example 22 | 30 | — | 220 | — | — | 75 | 2 | 15 |
| Example 23 | — | 25.9 | 221 | — | — | 75 | 2 | 15 |
| Example 24 | — | — | 184 | — | — | 75 | 2 | 15 |
| Comparative Example 1 | — | — | 192 | 0.15 | — | 75 | 2 | — |
| Comparative Example 2 | — | — | 237 | — | — | 75 | 2 | 15 |
| Comparative Example 3 | — | — | 237 | — | 0.3 | 155 | 2 | — |
| Comparative Example 4 | — | — | 211 | — | 0.3 | 155 | 2 | — |
| Comparative Example 5 | — | — | 192 | — | 0.3 | 155 | 2 | — |
| Comparative Example 6 | — | — | 175 | — | 0.3 | 155 | 2 | — |

In Table 1, BA represents butyl acrylate, 2HEA: 2-hydroxyethyl acrylate, 4HBA: 4-hydroxybutyl acrylate, 6HHA: 6-hydroxyhexyl acrylate, HEAA: hydroxyethylacrylamide, AA: acrylic acid, DMAEA: N,N-dimethylaminoethyl acrylate, DMAPAA: N,N-dimethylaminopropylacrylamide, NIPAM: N-isopropylacrylamide, PEA: phenoxyethyl acrylate and BzA: benzyl acrylate. In all cases shown in Table 1, peroxide is dibenzoyl peroxide (NYPER BMT 40 manufactured by NOF CORPORATION), and isocyanate-based compound is trimethylolpropanexylene diisocyanate (TAKENATE D-10N manufactured by Mitsui Takeda Chemicals, Inc.).

TABLE 2

| | Gel Fraction (wt %) | | | | Adhesive (N/25 mm) | | Reworkability | Durability | | | | | Workability | |
|---|---|---|---|---|---|---|---|---|---|---|---|---|---|---|
| | *1 (E1) | *2 | *3 (E1') | *4 (E2) | (E1' − E2) | Initial | After 60° C./ 48 Hours | Degree of Adhesive Residue | 80° C. | 90° C. | 95° C. | 100° C. | 60° C./ 90% RH | Sticky Feeling of Side Surface | Adhesive Fouling |
| Example 1 | 86.5 | 86.9 | 87.2 | 78.9 | 8.3 | 4.2 | 14.7 | ⊙ | ○ | Δ | Δ | Δ | ○ | ○ | ○ |
| Example 2 | 73.4 | 74.0 | 75.6 | 68.1 | 7.5 | 4.2 | 10.3 | ⊙ | ○ | Δ | Δ | Δ | ○ | ○ | ○ |
| Example 3 | 77.7 | 78.0 | 79.0 | 71.4 | 7.6 | 5.2 | 12.1 | ⊙ | ○ | Δ | Δ | Δ | ○ | ○ | ○ |
| Example 4 | 74.0 | 73.3 | 75.5 | 68.9 | 6.6 | 4.6 | 17.4 | ⊙ | ○ | Δ | Δ | Δ | ○ | ○ | ○ |
| Example 5 | 80.3 | 80.5 | 81.9 | 75.5 | 6.4 | 3.9 | 15.0 | ⊙ | ○ | Δ | Δ | Δ | ○ | ○ | ○ |
| Example 6 | 88.2 | 87.4 | 89.2 | 83.1 | 6.1 | 3.1 | 13.9 | ⊙ | ○ | Δ | Δ | Δ | ○ | ○ | ○ |
| Example 7 | 80.5 | 81.2 | 82.3 | 75.9 | 6.4 | 6.5 | 17.5 | ○ | ○ | Δ | Δ | Δ | ○ | ○ | ○ |
| Example 8 | 79.2 | 79.5 | 80.1 | 73.2 | 6.9 | 6.9 | 18.9 | Δ | ○ | Δ | Δ | Δ | ○ | ○ | ○ |
| Example 9 | 83.1 | 82.3 | 85.7 | 79.9 | 5.8 | 2.7 | 9.1 | ⊙ | ○ | Δ | Δ | Δ | ○ | ○ | ○ |
| Example 10 | 81.9 | 82.3 | 83.1 | 77.1 | 6.0 | 4.8 | 15.5 | ⊙ | ○ | Δ | Δ | Δ | ○ | ○ | ○ |
| Example 11 | 78.5 | 77.3 | 76.7 | 70.1 | 6.6 | 6.8 | 11.6 | ⊙ | ○ | Δ | Δ | Δ | ○ | ○ | ○ |
| Example 12 | 80.1 | 78.2 | 79.9 | 74.1 | 5.8 | 7.6 | 13.0 | ⊙ | ○ | Δ | Δ | Δ | ○ | ○ | ○ |
| Example 13 | 69.3 | 70.1 | 70.3 | 64.7 | 5.6 | 7.0 | 13.6 | ⊙ | ○ | ○ | Δ | Δ | ○ | ○ | ○ |
| Example 14 | 70.1 | 71.4 | 72.6 | 67.3 | 5.3 | 6.9 | 14.8 | ⊙ | ○ | ○ | Δ | Δ | ○ | ○ | ○ |
| Example 15 | 78.4 | 79.1 | 80.5 | 74.1 | 6.4 | 6.2 | 9.9 | ⊙ | ○ | Δ | Δ | Δ | ○ | ○ | ○ |
| Example 16 | 82.1 | 82.2 | 80.4 | 74.8 | 5.6 | 6.2 | 9.6 | ⊙ | ○ | Δ | Δ | Δ | ○ | ○ | ○ |
| Example 17 | 75.1 | 76.8 | 76.9 | 74.3 | 2.6 | 10.0 | 17.5 | ○ | ○ | ○ | ○ | Δ | ○ | ○ | ○ |
| Example 18 | 72.3 | 72.9 | 75.2 | 71.1 | 4.1 | 4.1 | 9.7 | ⊙ | ○ | ○ | Δ | Δ | ○ | ○ | ○ |
| Example 19 | 73.4 | 75.1 | 75.8 | 73.1 | 2.7 | 4.2 | 9.3 | ⊙ | ○ | ○ | ○ | Δ | ○ | ○ | ○ |
| Example 20 | 70.1 | 70.2 | 71.4 | 69.7 | 1.7 | 4.9 | 11.1 | ⊙ | ○ | ○ | ○ | Δ | ○ | ○ | ○ |
| Example 21 | 73.2 | 75.4 | 74.3 | 74.2 | 0.1 | 4.2 | 9.5 | ⊙ | ○ | ○ | ○ | ○ | ○ | ○ | ○ |
| Example 22 | 79.0 | 79.2 | 80.1 | 79.5 | 0.6 | 3.4 | 8.8 | ⊙ | ○ | ○ | ○ | ○ | ○ | ○ | ○ |
| Example 23 | 81.0 | 81.3 | 82.3 | 85.2 | −2.9 | 4.5 | 8.0 | ⊙ | ○ | ○ | ○ | ○ | ○ | ○ | ○ |
| Example 24 | 75.0 | 75.0 | 75.5 | 75.5 | 0 | 3.9 | 9.0 | ⊙ | ○ | ○ | ○ | ○ | ○ | ○ | ○ |
| Comparative Example 1 | 4.5 | 45.8 | 80.2 | 80.1 | 0.1 | 6.0 | 15.2 | ○ | ○ | ○ | ○ | Δ | ○ | X | X |
| Comparative Example 2 | 75.0 | 74.8 | 75.9 | 54.9 | 21.0 | 3.3 | 6.1 | ⊙ | X | X | X | X | X | ○ | ○ |
| Comparative Example 3 | 85.0 | 86.1 | 87.6 | 11.4 | 76.2 | 7.6 | 11.9 | ⊙ | X | X | X | X | X | ○ | ○ |
| Comparative Example 4 | 83.2 | 87.1 | 85.1 | 40.9 | 44.2 | 6.7 | 26.4 | X | X | X | X | X | X | ○ | ○ |
| Comparative Example 5 | 73.6 | 72.1 | 74.4 | 61.5 | 12.9 | 7.7 | 20.6 | X | ○ | Δ | Δ | Δ | ○ | ○ | ○ |
| Comparative Example 6 | 74.5 | 76.1 | 77.7 | 72.2 | 5.5 | 9.9 | 20.9 | X | ○ | ○ | Δ | Δ | ○ | ○ | ○ |

What is claimed is:

1. A pressure-sensitive adhesive optical film, comprising:
   an optical film; and
   a pressure-sensitive adhesive layer laminated on at least one side of the optical film, wherein
   the pressure-sensitive adhesive layer is formed from an acrylic pressure-sensitive adhesive comprising a (meth)acrylic polymer comprising 30 to 99.99% by weight of an alkyl(meth)acrylate monomer unit and 0.01 to 15% by weight of a functional group-containing monomer unit and the (meth)acrylic polymer is not crosslinked by a polyfunctional monomer, and
   the (meth)acrylic polymer in the acrylic pressure-sensitive adhesive is crosslinked by electron beam irradiation.

2. The pressure-sensitive adhesive optical film according to claim 1, wherein the functional group-containing monomer is at least one selected from a carboxyl group-containing monomer, a hydroxyl group-containing monomer, an amide group-containing monomer, and an amino group-containing monomer.

3. The pressure-sensitive adhesive optical film according to claim 1, wherein after the electron beam irradiation, the pressure-sensitive adhesive layer has a gel fraction (E1) of 50 to 95% by weight, after the pressure-sensitive adhesive layer is allowed to stand at 23° C. for 1 hour.

4. The pressure-sensitive adhesive optical film according to claim 3, wherein after the electron beam irradiation, the pressure-sensitive adhesive layer has a gel fraction (E2) of 30 to 95% by weight after the pressure-sensitive adhesive layer is allowed to stand at 23° C. for 1 week and then dried at 90° C. for 120 hours, and the difference (E1'−E2) between the gel fraction (E2) and the gel fraction (E1') after the pressure-sensitive adhesive layer is allowed to stand at 23° C. for 1 week is 20% by weight or less.

5. The pressure-sensitive adhesive optical film according to claim 1, wherein an adhesive strength of the pressure-sensitive adhesive layer is 1 to 10 N/25 mm, when the pressure-sensitive adhesive layer is peeled off at a peeling angle of 90 degrees and a peeling rate of 300 mm/minute, after the pressure-sensitive adhesive layer is adhered to a non-alkali glass plate and allowed to stand at 23° C. for 1 hour.

6. The pressure-sensitive adhesive optical film of claim 5, wherein an adhesive strength of the pressure-sensitive adhesive layer is 3 to 20 N/25 mm, when the pressure-sensitive adhesive layer is peeled off at a peeling angle of 90 degrees and a peeling rate of 300 mm/minute, after the pressure-sensitive adhesive layer is adhered to a non-alkali glass, allowed to stand at 23° C. for 1 hour and dried at 60° C. for 48 hours.

7. A method for producing a release liner-carrying pressure-sensitive adhesive optical film comprising the pressure-sensitive adhesive optical film according to claim 1 and a release liner attached to the pressure-sensitive adhesive layer of the pressure-sensitive adhesive optical film, comprising the steps of:
   (1a) applying an acrylic pressure-sensitive adhesive to a release liner to form a pressure-sensitive adhesive layer, wherein the acrylic pressure-sensitive adhesive comprises a (meth)acrylic polymer comprising 50 to 99.99% by weight of an alkyl(meth)acrylate monomer unit and 0.01 to 5% by weight of a functional group-containing monomer unit;
   (2a) crosslinking the pressure-sensitive adhesive layer by irradiating an electron beam to the pressure-sensitive adhesive layer from the pressure-sensitive adhesive layer side to form a crosslinked pressure-sensitive adhesive layer on the release liner; and
   (3a) adhering the crosslinked pressure-sensitive adhesive layer formed on the release liner to an optical film.

8. A method for producing a release liner-carrying pressure-sensitive adhesive optical film comprising the pressure-sensitive adhesive optical film according to claim 1 and a release liner attached to the pressure-sensitive adhesive layer of the pressure-sensitive adhesive optical film, comprising the steps of:
   (1b) applying an acrylic pressure-sensitive adhesive to a release liner to form a pressure-sensitive adhesive layer, wherein the acrylic pressure-sensitive adhesive comprises a (meth)acrylic polymer comprising 50 to 99.99% by weight of an alkyl(meth)acrylate monomer unit and 0.01 to 5% by weight of a functional group-containing monomer unit;
   (2b) adhering the pressure-sensitive adhesive layer formed on the release liner to an optical film; and
   (3b) crosslinking the pressure-sensitive adhesive layer by irradiating an electron beam to the pressure-sensitive adhesive layer from a side where the release liner is placed so that a crosslinked pressure-sensitive adhesive layer is formed.

9. An image display, comprising at least one piece of the pressure-sensitive adhesive optical film according to claim 1.

* * * * *